(12) United States Patent
Rai (10) Patent No.: US 8,772,705 B2
(45) Date of Patent: Jul. 8, 2014

(54) INTERPOLATION CIRCUITRY FOR OPTICAL ENCODERS

(75) Inventor: Abhay Kumar Rai, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 766 days.

(21) Appl. No.: 12/957,662

(22) Filed: Dec. 1, 2010

(65) Prior Publication Data
US 2012/0138781 A1    Jun. 7, 2012

(51) Int. Cl.
*G01D 5/34* (2006.01)

(52) U.S. Cl.
USPC ............ 250/231.13; 250/231.14; 250/231.15; 250/231.16; 250/231.17; 250/231.18; 341/13; 341/126

(58) Field of Classification Search
USPC ................... 250/231.13–231.18; 341/13, 126
See application file for complete search history.

(56) References Cited

U.S. PATENT DOCUMENTS

| | | | | |
|---|---|---|---|---|
| 4,592,002 A | * | 5/1986 | Bozarth et al. | 702/107 |
| 5,084,704 A | * | 1/1992 | Parrish | 341/164 |
| 5,867,116 A | * | 2/1999 | Nakamura et al. | 341/159 |
| 5,920,494 A | * | 7/1999 | Setbacken et al. | 708/290 |
| 6,188,922 B1 | | 2/2001 | Mistretta et al. | |
| 6,285,023 B1 | * | 9/2001 | Uehira | 250/231.13 |
| 6,342,697 B1 | * | 1/2002 | Nagai et al. | 250/231.13 |
| 6,355,927 B1 | | 3/2002 | Snyder et al. | |
| 6,653,619 B2 | | 11/2003 | Chin et al. | |
| 6,816,091 B1 | | 11/2004 | Chee | |
| 7,235,776 B2 | * | 6/2007 | Mayer et al. | 250/231.13 |
| 7,554,079 B2 | | 6/2009 | Rai et al. | |
| 8,087,888 B2 | * | 1/2012 | Rebsdorf et al. | 416/23 |
| 2003/0030570 A1 | | 2/2003 | Netzer | |
| 2010/0201422 A1 | | 8/2010 | Thor et al. | |
| 2010/0213997 A1 | | 8/2010 | Ng et al. | |

* cited by examiner

*Primary Examiner* — Georgia Y Epps
*Assistant Examiner* — Kevin Wyatt (57) ABSTRACT

Disclosed are various embodiments of circuitry and methods for generating interpolated signals in an optical encoder. The optical encoder configurations and circuitry disclosed herein permit very high resolution reflective optical encoders in small packages to be provided. Methods of making and using such optical encoders are also disclosed. According to one embodiment, the interpolated signals are generated through the use of signal generation circuitry, peak voltage generation circuitry, reference voltage generation circuitry, slope detection circuitry, and a clocked comparator that is configured to output interpolated output pulses.

25 Claims, 10 Drawing Sheets

INTERPOLATION CIRCUITRY FOR OPTICAL ENCODERS

FIELD OF THE INVENTION

Various embodiments of the inventions described herein relate to the field of optical encoders, and components, devices, systems and methods associated therewith.

BACKGROUND

Optical encoders are typically employed as motion detectors in applications such as closed-loop feedback control in motor control systems. By way of example, many optical encoders are configured to translate rotary motion or linear motion into a two-channel digital output for position encoding.

Many optical encoders employ an LED as a light source. In transmissive encoders, the light is collimated into a parallel beam by means of a lens located over the LED. Opposite the emitter is a light detector that typically consists of photodiode arrays and a signal processor. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

A typical reflective optical encoder comprises a light detector, a light emitter and a code wheel or code scale. The detector generates an output by processing photocurrents provided by photodiode arrays included in the light detector. In general, reflective optical encoders include four photodiode channels, namely A, A/, B and B/, which are arranged along a single track in a 2-channel optical encoder. The photodiodes are arranged so that gaps separating adjacent photodiodes are sufficiently large to prevent or inhibit crosstalk from being generated between such adjoining photodiodes. In the prior art, as the resolution of an optical encoder increased, the spacing between adjoining photodiodes decreased, which in turn led to increased crosstalk between channels.

Interpolation circuitry is commonly employed in incremental and absolute digital motion encoding systems, where the interpolation circuitry is configured to generate digital pulses having higher frequencies than base sinusoidal analog signals input to the circuitry. As the interpolation factor of the circuitry increases, the accuracy of the interpolation circuitry becomes ever more critical since the output provided by such circuitry ultimately determines the accuracy of the encoding system. Unfortunately, due to the architecture of most interpolation circuitry—which typically relies on a large number of comparators—the outputs provided by interpolation circuitry tend to be noisy and contain undesired noise spikes arising from excessive switching in the comparators. As a result, the comparators employed in interpolation circuitry for motion encoders are typically characterized by a significant amount of hysteresis, which can provide some immunity from noise spikes. The hysteresis itself can become a source of inaccuracy for the interpolation circuitry, however, especially at high interpolation factors.

Figure 1:
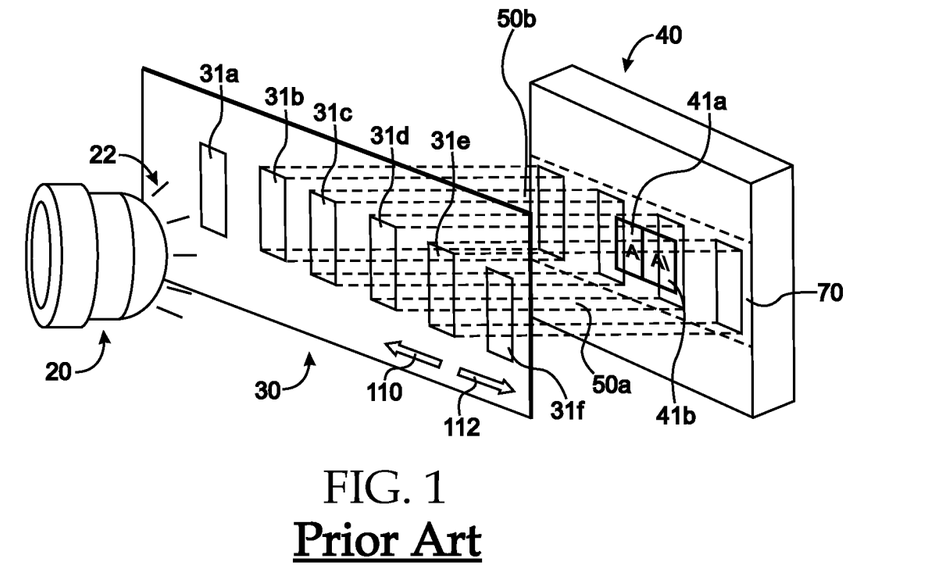
FIG. 1 shows a prior art optical encoder system 10.

Referring to FIG. 1, there is shown an optical encoder system 10 of the prior art comprising light emitter 20 (typically an LED), code wheel or code strip 30 having apertures 31a-31f disposed therein, and light detector 40 comprising photodiodes 41a (A) and 41b (A\). In optical encoder 10, collimated light beam 22 emitted by light emitter 20 projects light onto code wheel 30. Collimated light beam 22 is interrupted by masked or optically opaque sections disposed between apertures 31a-31f as code wheel or code strip 30 rotates in first direction 111 or in second direction 112. (Note that code wheel or code strip 30 rotates substantially in a plane defined approximately by collimated light beam 22 as it is projected from light emitter 20 towards light detector 40.) Portions 50a and 50b of collimated light beam 22 project through apertures 31c and 31d and sweep across light detector 40 and photodiodes 41b (A\) and 41a (A) as code wheel or code strip 30 rotates in direction 111 or 112 in the plane. As code wheel 30 moves in direction 111 or 112, the light patterns projected onto first vertical portion 70 of light detector 40 by beam portions 50a and 50b change, and the output signals provided by photodiodes 41a and 41b change correspondingly. These output signals are generally employed to generate a pair of quasi-triangular signals (as shown, for example, in FIG. 2), which are then used to determine any one or more of the position, speed and direction of code disk 30.

Figure 2:
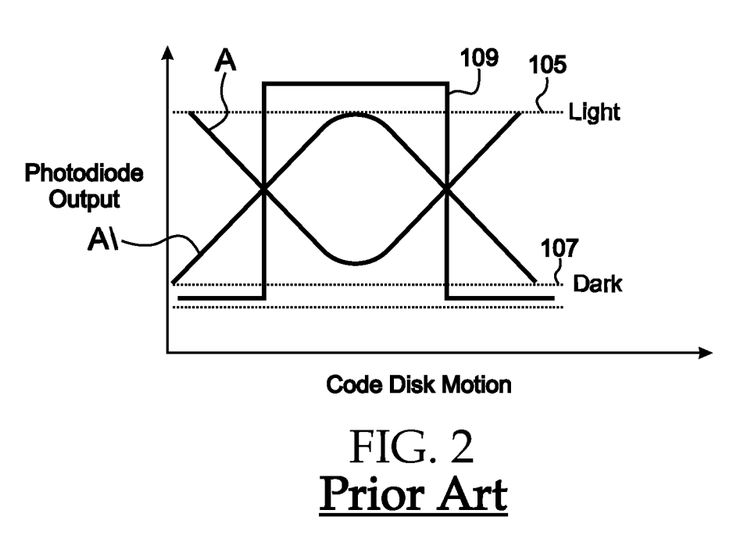
FIG. 2 shows "triangular" signals A and A\.

Referring now to FIG. 2, there are shown "triangular" signals A and A\, which are compared to one another and employed to generate pulse 109 using circuitry and methods well known to those skilled in the art of optical encoders. Typically, another set of photodetectors B and B\ is also provided, where photodetectors B and B\ are positioned 90 degrees out of phase with respect to photodetectors A and A\, and which are employed to generate another pulse (not shown in FIG. 2). Pulses for photodetectors A and A\, and B and B\, are generated which are 90 degrees out of phase with respect to one another. As shown in FIG. 2, pseudo-triangular signals A and A\, which for purposes of subsequent interpolation processing would optimally be linear or straight between maximum and minimum portions thereof, exhibit curved portions near the tops and bottoms thereof. These curved portions are due to undesirable capacitance effects, and complicate considerably any subsequent attempts at interpolation.

In an encoder of the type shown in FIG. 1, the spatial resolution of device 10 is generally determined and set according to the specific requirements of the end user. More particularly, the distances or spacing between adjoining photodetectors A and A\ (41a and 41b, respectively), are typically determined according to the particular requirements of a given customer or end user. Time and effort are required to implement such requirements, especially in respect of wafer fabrication when an unusual or new spatial resolution for device 10 is required.

Figure 3:
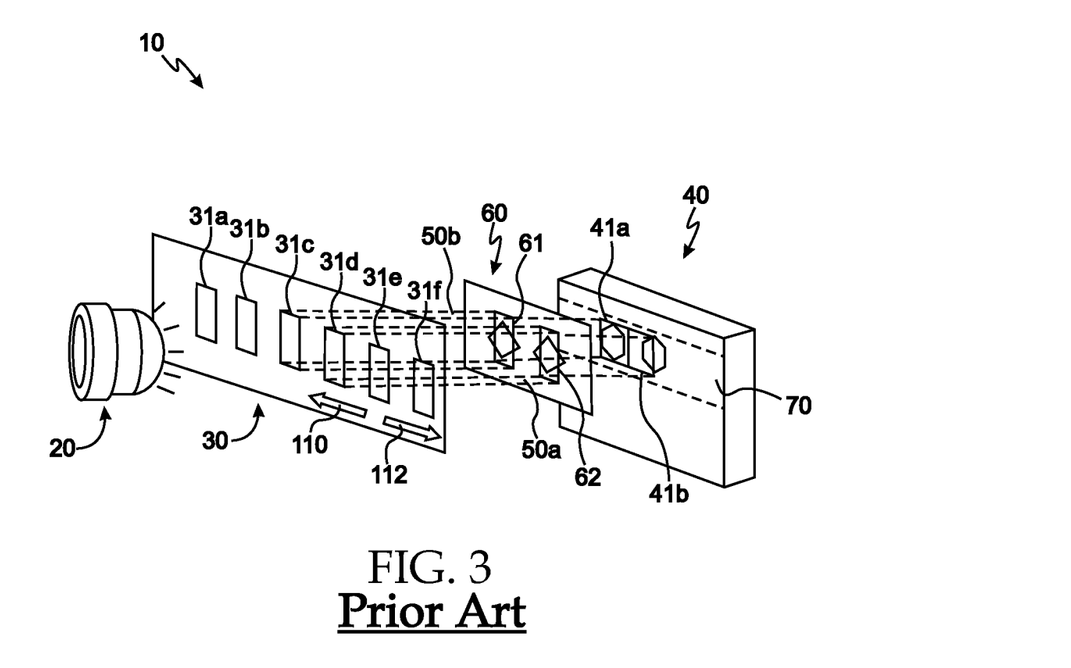
FIG. 3 shows a prior art optical encoder 10 having a reticle 30 disposed between light emitter 20 and light detector 40.

One technique employed in the prior art to change or adjust the spatial resolution provided by device 10 is to employ one or more reticles disposed between light emitter 20 and light detector 40. FIG. 3 shows one such arrangement, where reticle strip 60 has reticles 61 and 62 disposed therein. Reticles 61 and 62 are configured to interfere with the light beams impinging thereon, and to modify them so that the pattern of light projected on light detectors 40 is changed. Reticles 61 and 62 are specifically configured to provide the degree, amount and type of spatial resolution desired of encoder 10.

Figure 4:
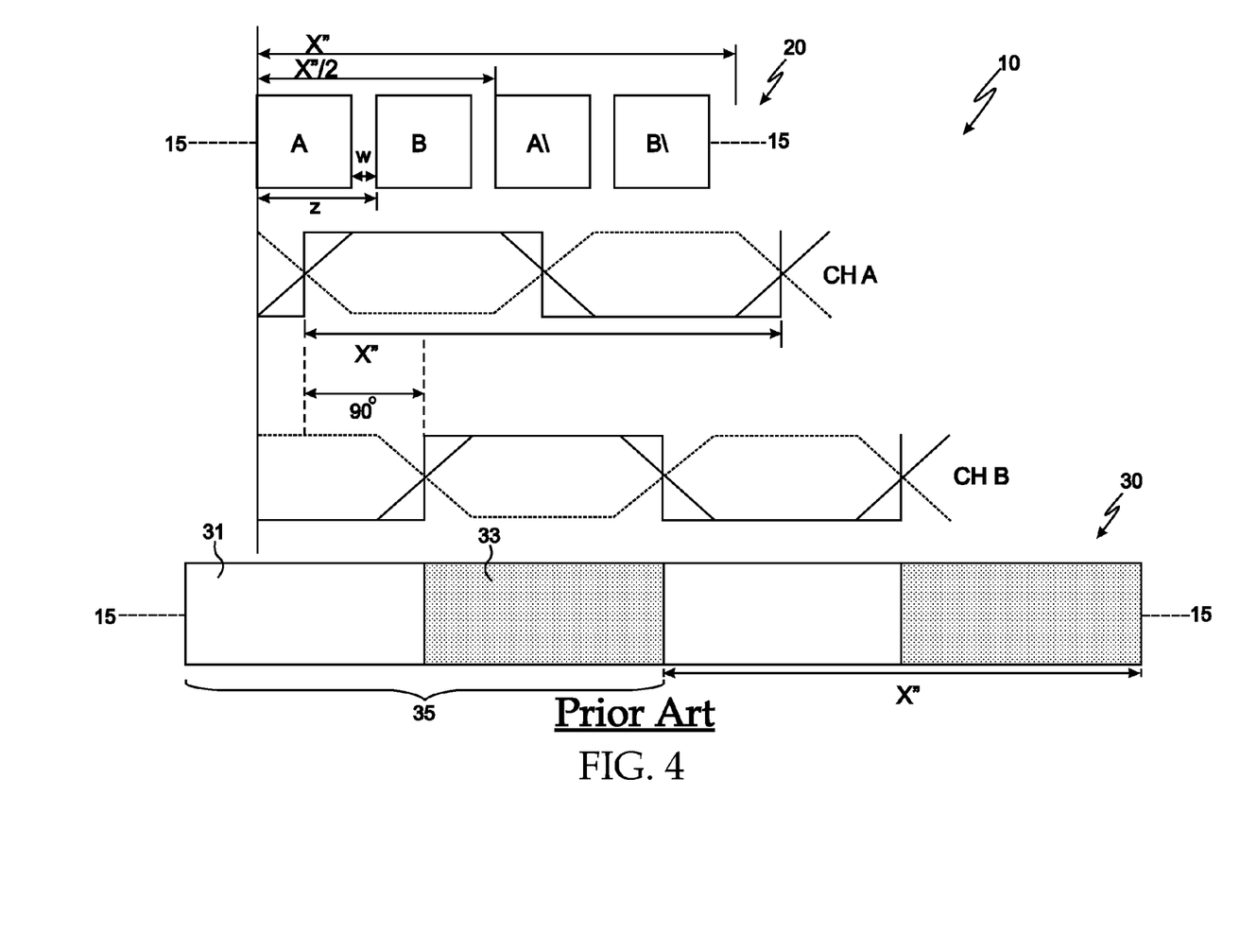
FIG. 4 shows a prior art single track optical encoder 10 with photodiode array 20.

FIG. 4 shows a conventional prior art single track optical encoder 10 with photodiode array 20 comprising detectors A, A\, B and B\ in a two-channel encoder with associated code strip 30. Signals generated by detectors A and A\ (channel A)

and B and B\ (channel B) are also shown in FIG. 4, where the Channel B output signal lags the Channel A output signal by 90 degrees. (The relatively simple circuitry employed to generate output signals for channels A and B is not shown in FIG. 4, but is well known to those skilled in the art and therefore need not be discussed further herein.) The separation between adjoining photodiodes in array 20 and the width of each photodiode is selected according to the resolution that is required of the optical encoder. When the resolution of optical encoder 10 is increased, either the spacing w between adjoining photodiodes is reduced, or the width of each photodiode along common axis 15 is reduced, or both, resulting in photodiode spacing z being decreased, where z is the spacing between the leading or trailing edges of adjoining photodiodes.

Note that in optical encoder 10 illustrated in FIG. 4, the spacing z between the leading or trailing edges of adjoining photodiodes corresponds to one-quarter the combined width of a single pair of adjoining light and dark strips on code scale 30. As a result, two photodiodes are contained within a distance defining the length of each such strip along common axis 15. Note further that in optical encoder 10 illustrated in FIG. 4, all photodiodes disposed along single track or common axis 15 are arranged in the order or sequence A, B, A\, and B\.

Two issued patents that discuss interpolation circuits are U.S. Pat. No. 6,355,927 entitled "Interpolation Methods and Circuits for Increasing the Resolution of Optical Encoders" to Snyder and U.S. Pat. No. 6,816,091 entitled "Interpolator" to Chee, the respective entireties of which are hereby incorporated by reference herein.

In U.S. Pat. No. 6,355,927, interpolation is accomplished by detecting the crossings of sine and cosine signals, which are then used to determine phase angle. However, since this technique uses $2A \sin \theta$, $3A \sin \theta$, $2A \cos \theta$, $3A \cos \theta$, ..., $A/2 \sin \theta$, $A/3 \sin \theta$, $A/2 \cos \theta$, $A/3 \cos \theta$ signals, and so on, for detecting crossings, relatively complex analog circuitry is required to generate such intermediate signals, which are always subject to inherent errors contributed by analog processing circuits and their corresponding matching inaccuracies. Also, at the moment in time where signals $3A \sin \theta$ and $A/3 \cos \theta$ cross over one another, for example, one signal has a very high slope and the other signal has a sluggish slope. This results in a phase error between the interpolated outputs. Phase errors increase when crossings are detected in signals differing by more than 90 degrees in phase. The type of interpolation described in U.S. Pat. No. 6,355,927 is quite complex, as it requires a large amount of relatively complicated analog circuitry capable of generating the several intermediate signals needed to detect crossings.

In many industrial applications, analog-to-digital converters (ADCs) are used top provide interpolated signals. Such an approach requires, however, a significant amount of hardware and therefore requires larger chip areas. Also, non-linearities inherent in many ADCs can significantly detract from interpolation accuracy.

Several other techniques and devices are sometimes used to interpolate sinusoidal or trapezoidal signals to more accurately determine the speed and position of industrial motion encoders. See, for example, optical encoders manufactured by firms such as ic-Haus Integrated Circuits and Microsystem GmbH. Such devices can exhibit several shortcomings, however, such as using a large amount of hardware (which makes them prone to analog non-linearities and hence phase errors in interpolated outputs) and requiring the use of expensive dynamic compensation circuitry techniques. Such devices may also be prone to process, temperature and voltage variations, and variable phase errors due to detection threshold problems like those described above. Thus, any motion control encoders feature designs that have reached their limits with respect to frequency, performance, and accuracy due to process and other limitations.

What is needed is a high speed and accurate interpolation encoder that can overcome at least some of the foregoing problems.

SUMMARY

In some embodiments, there is provided a method of interpolating optical encoder signals comprising emitting light from a light emitter towards a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, generating first, second, third and fourth output ramp signals corresponding, respectively, to the A, A\, B and B\ light detectors, the A and B light detectors, and the A\ and B\ light detectors, respectively, being arranged to generate output signals that are 90 degrees out of phase with respect to one another, generating a peak voltage and an offset voltage corresponding to the output ramp signals, and providing the peak voltage and the offset voltage to reference voltage generation circuitry as inputs thereto, generating, with a resistor ladder or a digital-to-analog converter (DAC) and corresponding controllable switches in the reference voltage generation circuitry, and on the basis of the peak and offset voltages, a plurality of different reference voltages, each reference voltage corresponding to a predetermined angular position of a sinusoidal signal over a predetermined range of angular positions, one of such reference voltages being provided at any given time as a first input to a clocked comparator, generating, with a slope detection circuit having provided as inputs thereto the first, second, third and fourth output ramp signals, slope detection circuit output signals corresponding to the predetermined range of angular positions for each of the first, second, third and fourth output ramp signals as such angular positions occur and providing such slope detection circuit output signals as a second input to the clocked comparator, and outputting from the clocked comparator, on the basis of the first and second inputs to the clocked comparator, interpolated output pulses.

In other embodiments, there is provided an optical encoder comprising a light emitter configured to emit light therefrom a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals, signal generation circuitry comprising at least first, second, third and fourth amplifiers configured to receive as inputs thereto, respectively, the first, second, third and fourth output ramp signals corresponding to the A, A\, B and B\ light detectors, the first amplifier being configured to provide an A output ramp signal, the second amplifier being configured to an A\ output ramp signal, the third amplifier being configured to provide a B output ramp signal, the fourth amplifier being configured to a B\ output ramp signal, peak voltage generation circuitry configured to generate a peak voltage corresponding to the output ramp signals, reference voltage generation circuitry comprising a resistor ladder or a digital-to-analog converter (DAC) and corresponding controllable switches configured to generate on the basis of the peak and offset voltages provided as inputs thereto a plurality of different reference voltages, each reference voltage corresponding to a predetermined angular position of a sinusoidal signal over a predetermined range of angular positions, one of such reference voltages being provided at any given time as a first input to a clocked comparator, and slope detection circuitry having provided as inputs thereto the first, second, third and fourth output ramp signals, and configured to generate slope detection circuitry output signals corresponding to the predetermined range of angular positions for each of the first, second, third and fourth output ramp signals as such angular positions occur, such slope detection circuitry output signals being provided as a second input to the clocked comparator, wherein the clocked comparator is configured to output on the basis of the first and second inputs thereto interpolated output pulses.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

In various embodiments of the invention, single track reflective optical encoder systems, devices and methods, are provided.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

Figure 5:
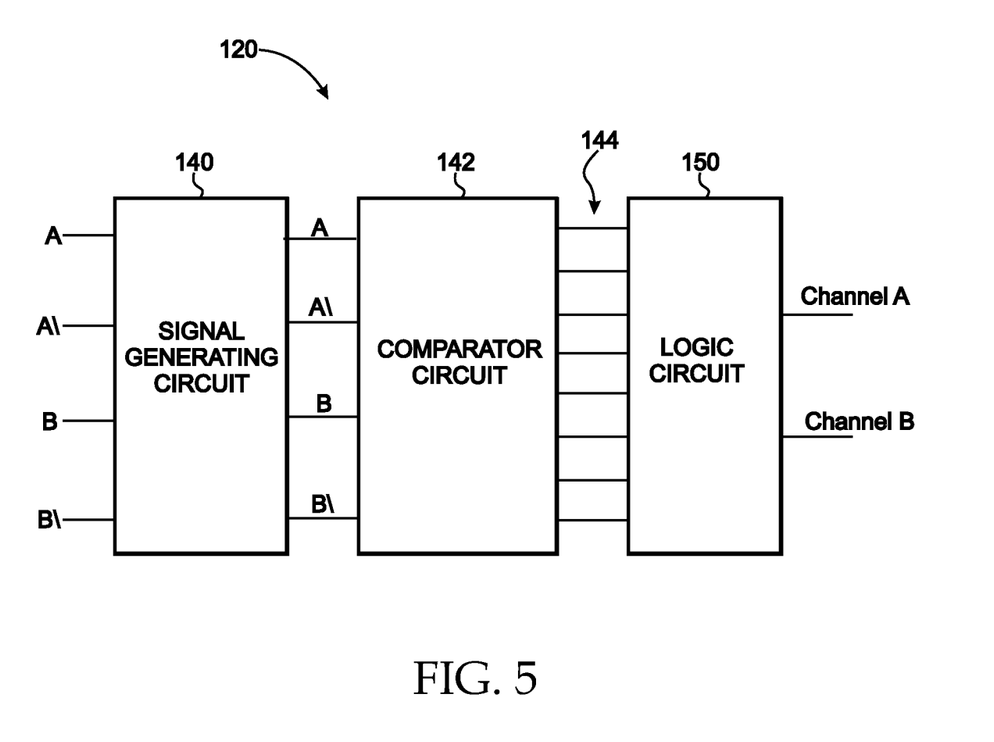
FIG. 5 shows signal generating, comparator and logic circuits 120.

A block diagram of an interpolation circuit 120 is shown in FIG. 5. The A, A\, B and B\ ramp signals are input to a signal generating circuit 140. The signal generating circuit 140 provides amplified A, A\, B and B\ ramp signals to a comparator circuit 142. Comparator circuit 142 generates intermediate interpolated signals on lines 144. The intermediate signals are supplied to a logic circuit 150, which combines the intermediate signals and generates channel A and channel B output signals as described below.

Figure 6:
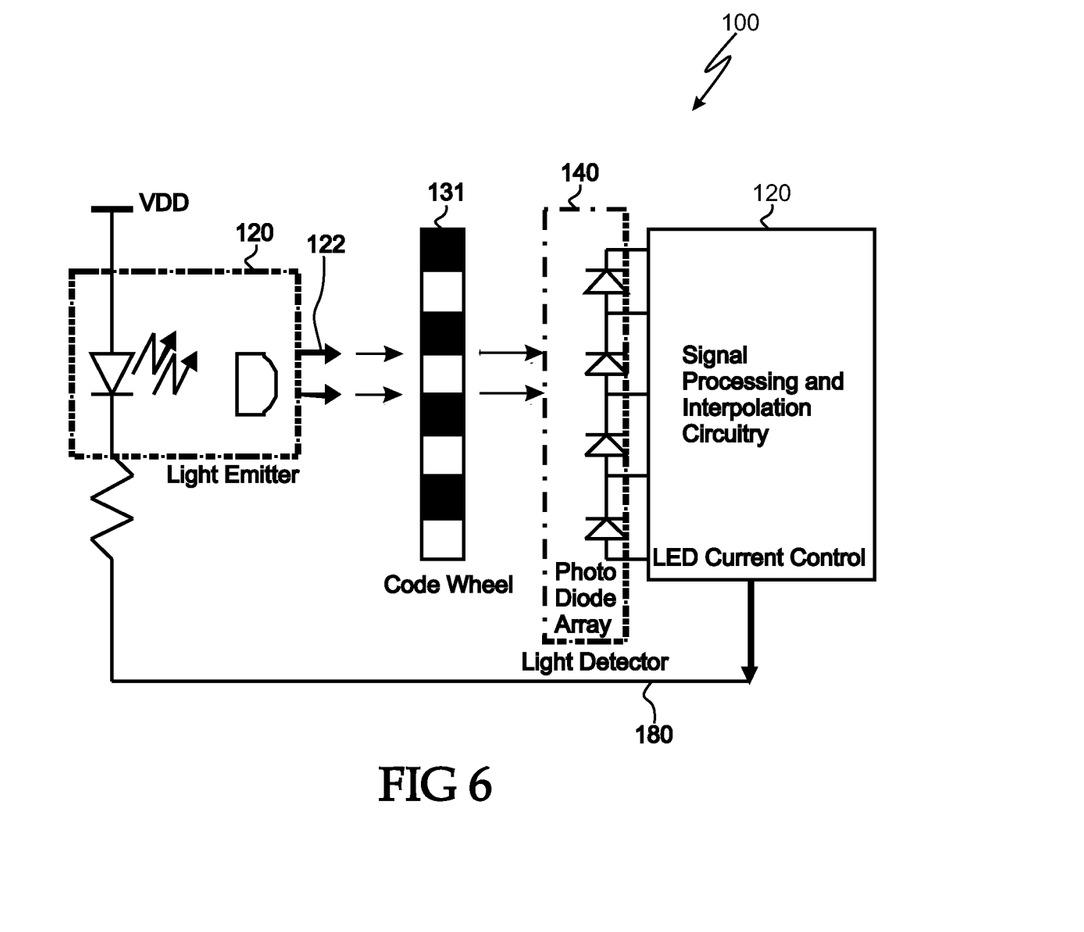
FIG. 6 shows portions of one embodiment of an optical encoder 100.

Referring now to FIG. 6, there is shown one embodiment of an optical encoder 100 comprising light emitting diode (LED) 120, which illuminates code wheel 130. Light reflected from code wheel 130 impinges upon light detector 140 and converts the resulting optical signals into electrical signals employed to detect the speed and position of an external device or component operably connected to encoder 100, such as a motor shaft. The accuracy of optical encoder 100 is increased by interpolating the sinusoidal signals generated by light detector 140. Feedback loop 180 is employed to ensure that peak-to-peak or other maximum voltages of the sinusoidal signals provided by light detector 140 are of uniform amplitude. Various means and methods known to those skilled in the art may be employed to regulate and control such peak-to-peak or other maximum voltages, including, but not limited to, the techniques and circuitry described in U.S. Pat. No. 7,554,079 to Rai entitled "Signal Conditioning for Optical Encoder Devices," the entirety of which is hereby incorporated by reference herein.

Figure 7:
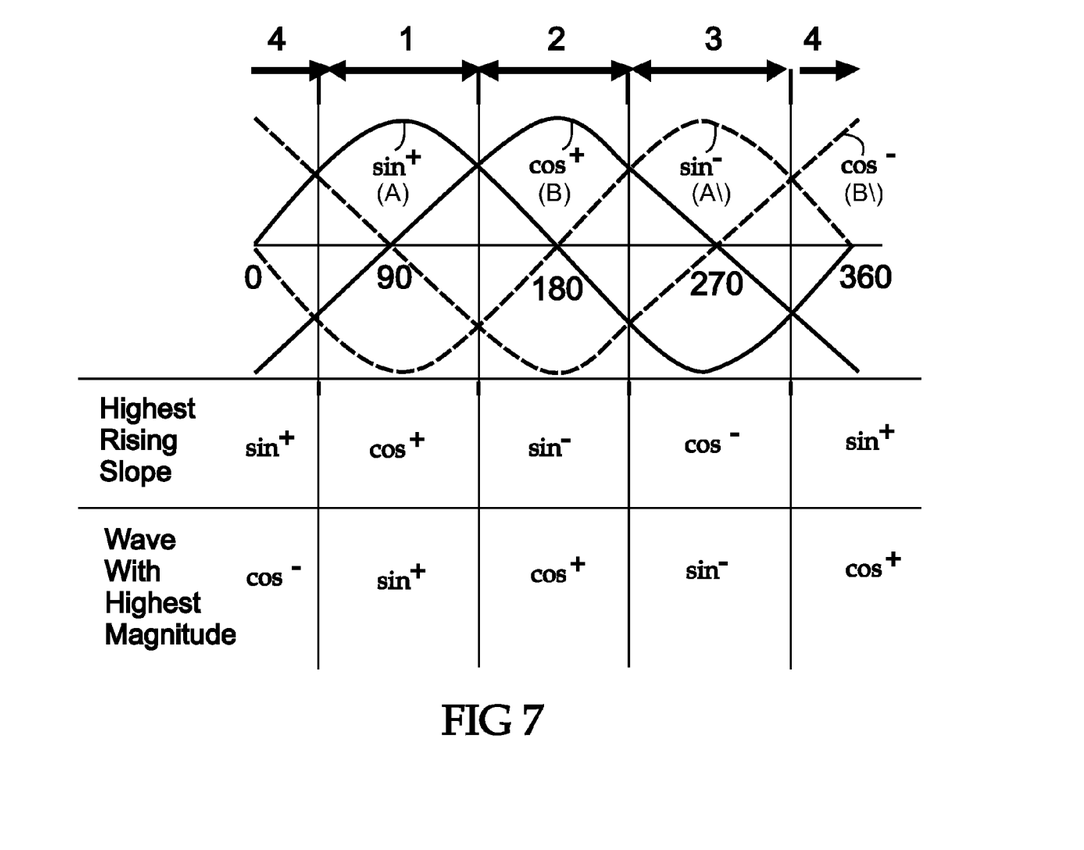
FIG. 7 illustrates the phase relationships between incoming sinusoidal signals A, B, A\ and B\ according to one embodiment.

FIG. 7 shows four sinusoidal signals generated by signal generating circuit 140: signals Sin+ (or A), Cos+ (or B), Sin− (or A\), and Cos− (or B\). As shown in FIG. 7, these four signals are 90 degrees out of phase with respect to one another in the order in which they are presented. Further as shown in FIG. 7, the steepest positively-sloping portions of these four signals occur at the following positions: −45/315 degrees to 45 degrees: sin+; 45 degrees to 135 degrees: cos+; 135 degrees to 225 degrees: sin−; 225 degrees to 315 degrees: cos−. The foregoing steeply sloping portions of each waveform are utilized selectively to generate interpolated signals having a high degree of accuracy, and which are not prone to generating undesired phase errors in the interpolated outputs provided by interpolation circuit 120, more about which is said below.

It is important that signals A, A\, B and B\ presented to the inputs of comparator circuit 142 by signal generating circuit 140 have uniform and stable peak-to-peak or other maximum amplitudes. Feedback loop 180 in FIG. 6 is employed to ensure that such peak-to-peak or other maximum amplitudes are uniform. Because the incoming amplified signals utilized to selectively generate interpolated signals have uniform peak or maximum amplitudes, they may be compared to predetermined or calculated amplitudes corresponding at desired angular increments, and thus the slope and phase of each incoming signal can be determined with great accuracy. In one embodiment, signal conditioning circuitry is employed to measure the peak-to-peak amplitudes of the incoming sinusoidal signals provided by circuit 140, which may comprise one or more transimpedance amplifiers, and to tune the gains of the transimpedance amplifiers so that the peak-to-peak voltage outputs of all the incoming sinusoidal signals provided at the outputs of the transimpedance amplifiers always assume fixed values (e.g., 1 volt peak amplitude, and therefore 2 volts peak-to-peak). In another embodiment, current through a transistor emitter can be controlled by a signal conditioning block in circuit 140, which controls the luminance of light emitter 20 and therefore the amplitudes of incoming sinusoidal signals being provided as outputs from the transimpedance amplifiers at fixed value (e.g., 1 volt peak amplitude, and therefore 2 volts peak-to-peak).

Assuming the peak positive amplitude of each incoming signal provided by circuit 140 is 1.0 volt, Table 1 below presents the predetermined or calculated amplitudes corresponding to Sine and Cosine signals at 9 degree increments for an accurate 20× interpolated output signal.

TABLE 1

Predetermined Reference Values at 9 Degree Increments

| Sinusoidal phase | Value | Equivalent cosine |
|---|---|---|
| Sin0 | 0.00 | Cos270 |
| Sin9 | 0.1564 | Cos279 |
| Sin18 | 0.3090 | Cos288 |
| Sin27 | 0.4540 | Cos297 |
| Sin36 | 0.5878 | Cos306 |
| Sin45 | 0.7071 | Cos315 |
| Sin54 | 0.8090 | Cos324 |
| Sin63 | 0.8910 | Cos333 |
| Sin72 | 0.9510 | Cos342 |
| Sin81 | 0.9877 | Cos351 |
| Sin90 | 1.00 | Cos0/cos360 |
| Sin99 | 0.9877 | Cos9 |
| Sin108 | 0.9510 | Cos18 |
| Sin117 | 0.8910 | Cos27 |
| Sin126 | 0.8090 | Cos36 |
| Sin135 | 0.7071 | Cos45 |
| Sin144 | 0.5878 | Cos54 |
| Sin153 | 0.4540 | Cos63 |
| Sin162 | 0.3090 | Cos72 |
| Sin171 | 0.1564 | Cos81 |
| Sin180 | 0.00 | Cos90 |
| Sin189 | −0.1564 | Cos99 |
| Sin198 | −0.3090 | Cos108 |
| Sin207 | −0.4540 | Cos117 |
| Sin216 | −0.5878 | Cos126 |
| Sin225 | −0.7071 | Cos135 |
| Sin234 | −0.8090 | Cos144 |
| Sin243 | −0.8910 | Cos153 |
| Sin252 | −0.9510 | Cos162 |
| Sin261 | −0.9877 | Cos171 |
| Sin270 | −1.00 | Cos180 |
| Sin279 | −0.9877 | Cos189 |
| Sin288 | −0.9510 | Cos198 |
| Sin297 | −0.8910 | Cos207 |
| Sin306 | −0.8090 | Cos216 |
| Sin315 | −0.7071 | Cos225 |
| Sin324 | −0.5878 | Cos234 |
| Sin333 | −0.4540 | Cos243 |
| Sin342 | −0.3090 | Cos252 |
| Sin351 | −0.1564 | Cos261 |
| Sin360 | 0.00 | Cos270 |

Several conclusions can be drawn from Table 1. First, the sine signal has a rising slope between 270 degrees and 90 degrees. Second, the slope of the sine signal is maximized between 315 degrees and to 45 degrees and between 135 degrees and 225 degrees (for a positive slope), but is sluggish between 45 degrees and 90 degrees, and 90 degrees and 135 degrees. Third, sinusoidal values repeat themselves around 90 degrees for positive slopes (e.g., Sine 81 degrees=Sine 99 degrees, and the Sine 9 degrees=Sine 171 degrees). Similarly, sinusoidal values repeat themselves around 180 degrees for negative slopes.

As disclosed herein, predetermined reference values (or voltages) such as those shown in Table 1 are employed to detect the slopes of incoming signals provided by circuit 140. As Table 1 shows, the slope of an incoming sinusoidal signal may be determined by detecting its amplitude. Thus, for example, if an incoming sinusoidal signal has a peak amplitude of 1 volt, a comparator having a reference comparison voltage of 0.1564 volt can be used to detect whenever an incoming sinusoidal signal attains a value equivalent to the Sine of 9 degrees (see Table 1 above).

For an interpolation factor of X, every change of slope corresponding to 360/X must be detected. Thus, for an interpolation factor of 20×, changes in slope of an incoming sinusoidal signal must be detected in at least 18 degree increments. The slopes of the sinusoidal signals are highest near zero crossings and lowest near the peaks of such sinusoidal signals. As described above, sine and cosine are 90 degree out of phase, and thus when a sine signal has a sluggish or low slope, a corresponding cosine signal has a high slope. To avoid or minimize phase errors in the final interpolated output, and as described above in connection with FIG. 7, the following method is therefore employed to provide interpolated signals, where selected portions or quadrants of incoming sine and cosine signals provided by signal generation circuit 140 are successively detected:

0°–45°→Sin+

45°–135°→Cos+

135°–225°→Sin−

225°–315°→Cos−

315°–360°→Sin+

See FIG. 7 and the above discussion regarding same.

Figure 8:
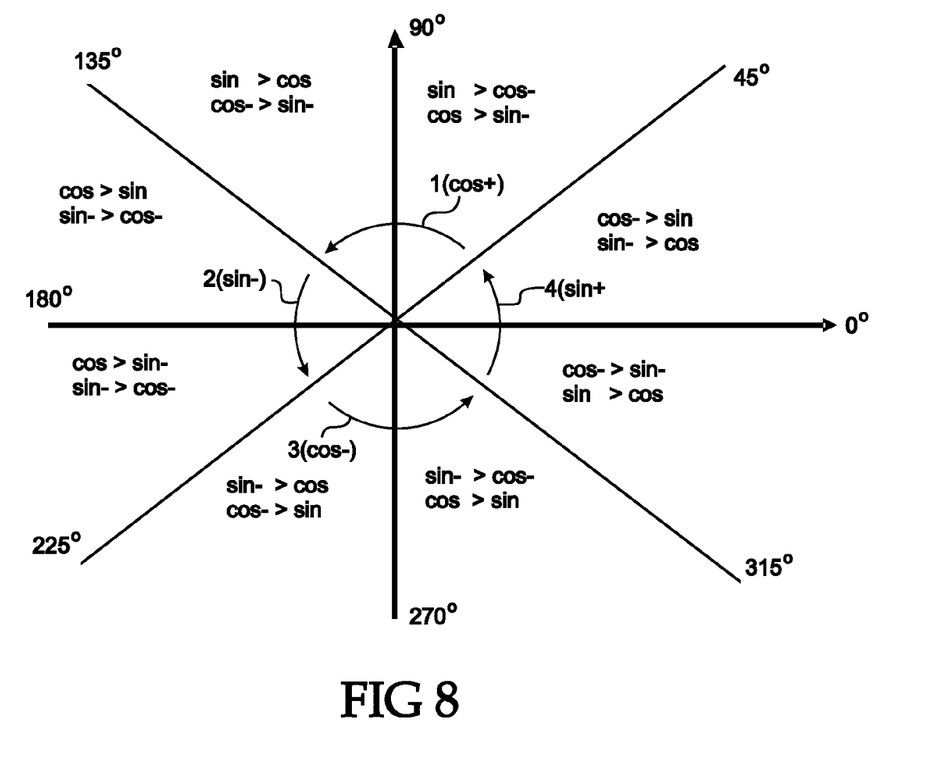
FIG. 8 illustrates the selective use of certain portions of incoming sinusoidal signals A, B, A\ and B\ for interpolation according to one embodiment.

The concept of employing selective portions of the incoming sinusoidal signals provided by circuit 140 to increase interpolation accuracy is now described in further detail. If the incoming sinusoidal (sine) and co sinusoidal (cosine) signals are normalized and have a peak amplitude of 1 volt, such incoming signals have values $1 \sin\theta$ and $1 \cos\theta$. If 20× interpolation is desired to be carried out, slope change must be detected in 18 degree increments. Since interpolation pulses typically should have a 50% duty cycle, however, and to achieve a 20× interpolation factor, interpolation must be carried out at an interpolation rate of 40×, followed by using a divide-by-2 circuit to yield an output interpolated signal having a 50% duty cycle. Thus, for a 20× interpolation factor with 50% duty cycle, slope change must be detected in 9 degree increments for each incoming sinusoidal signal. When the slope of an incoming sinusoidal signal A provided by circuit 140 is rising and has just crossed 0 degrees, the interpolation circuitry must be capable of detecting when the sinusoidal signal crosses sin(9°), sin(18°), sin(27°), sin(36°), sin(45°), and so on, during which periods of time interpolation pulses are generated. When the amplitude corresponding to the sin(45°) has been detected, the interpolation circuitry switches to detecting the incoming co sinusoidal signal B between 45 degrees and 135 degrees, during which periods of time interpolation pulses are also generated. The interpolation process continues for incoming signals A\ and B\ between 135 and 225 degrees, and 225 and 315 degrees, and between 315 degrees and 360 degrees for incoming sinusoidal signal A, during which periods of time interpolated pulses continue to be generated. FIG. 8 further illustrates the sequence according which interpolated pulses are generated for each of incoming sinusoidal and co sinusoidal signals A, B, A\ and B\.

Figure 9:
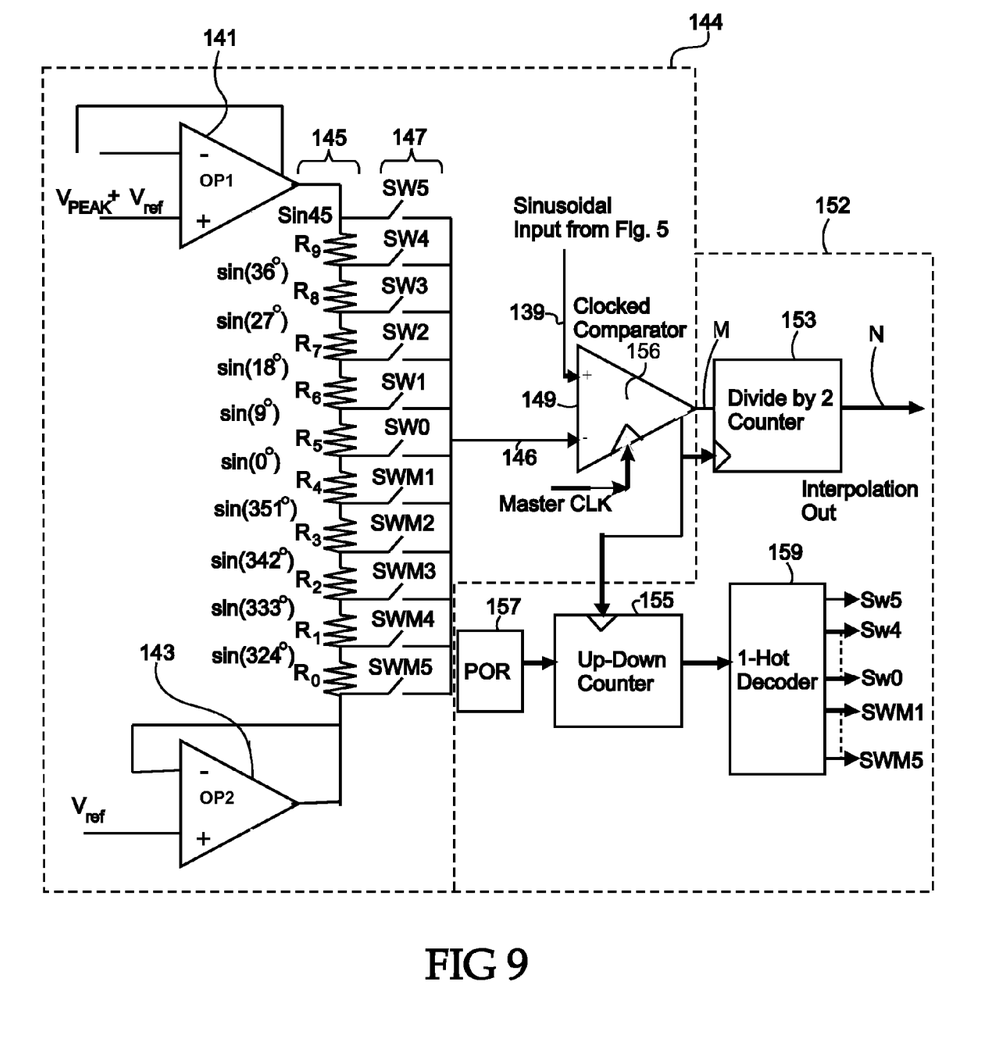
FIG. 9 shows one embodiment of reference voltage generation circuitry 144 and logic circuitry 152.

Referring now to FIG. 9, there is shown one embodiment of interpolation circuit 144 and logic circuit 152 constructed in accordance with the above teachings. As shown in FIG. 9, the peak voltage of the incoming sinusoidal and co sinusoidal signals and a reference voltage are supplied to the non-inverting inputs of voltage follower or operational amplifier OP1 (141). The reference voltage is also provided to voltage follower or operational amplifier OP2 (143). The outputs of operational amplifiers 141 and 143 are provided to SW0-SW5 and SWM1-SWM5, and along with operational amplifiers 141 and 143 are used to dynamically set the reference comparison voltages. Note that the values of resistors R0 through R9 are selected in accordance with the predetermined reference voltages or values. Decision logic in logic circuit 152 then determines when to detect sin+, cos+, sin− or cos− positive or negative slopes, as described above. If the decision logic is employed to detect positive slopes, counter 155 works as a down-up counter. Counter 155 is a 4-bit binary up-down counter. A 0000 at the output of counter 155 enables SW0, 0001 enables SW1, 0010 enables SW2, 0011 enables SW3, 0100 enables SW4, 0101 enables SW5, 1111 enables SWM1, 1110 enables SWM2, 1101 enables SWM3, 1100 enables SWM4, and 1011 enables SWM5. The up-counting sequence is 1011-1100-1101-1110-1111-0000-0001-0010-0011-0100-0101, and the down-counting sequence is 0101-0100-0011-0010-0001-0000-1111-1110-1101-1100-1011.

Continuing to refer to FIG. 9, at power-on-reset the count starts from 0000 and goes up to 0101 when counting up, or to 1011 when counting down, depending on the particular decision logic being employed. Power-on-reset (POR) counter 157 resets to a default count of 0000. When 0000 is presented at the output of counter 155, 1-hot decoder 159 is enabled to turn on SW0. This connects the reference voltage corresponding to sin(0°) to the negative input of clocked comparator 156. If the decision logic is configured to detect positive slopes, when an incoming sinusoidal signal is connected to the positive input of clocked comparator 156, and when the incoming sinusoidal signal crosses sin(0°) or becomes greater then sin(0°), the output of clocked comparator 156 goes high, which in turn moves the count of up-counter 155 by 1 to 0001. 1-hot decoder 159 then switches on SW1 and turns off SW0, while all other switches remain turned off. SW1 is then connected to a new reference voltage corresponding to sine 9° of the negative input of clocked comparator 156. Comparator 156 waits for a sinusoidal input connected to its positive input to cross the sine(9°), and when the input sinusoidal input does so, the output of clocked comparator 156 again goes high, which moves the count up by 1 and turns SW2 on. This process keeps repeating until the sine(45°) crossing is detected and SW5 is turned on. At this time, the negative cosine wave has a maximum slope and is connected to circuit 144 by the decision logic in circuit 152. Counter 155 will now count down as follows: 0101-0100-0011-0010-0001-0000-1111-1110-1101-1100-1011 (i.e., cos(225°)−cos(315°)). Divide-by-2 counter 153 at the output of clocked comparator 156 is employed to yield a 50% duty cycle series of interpolated output pulses.

Figure 11:
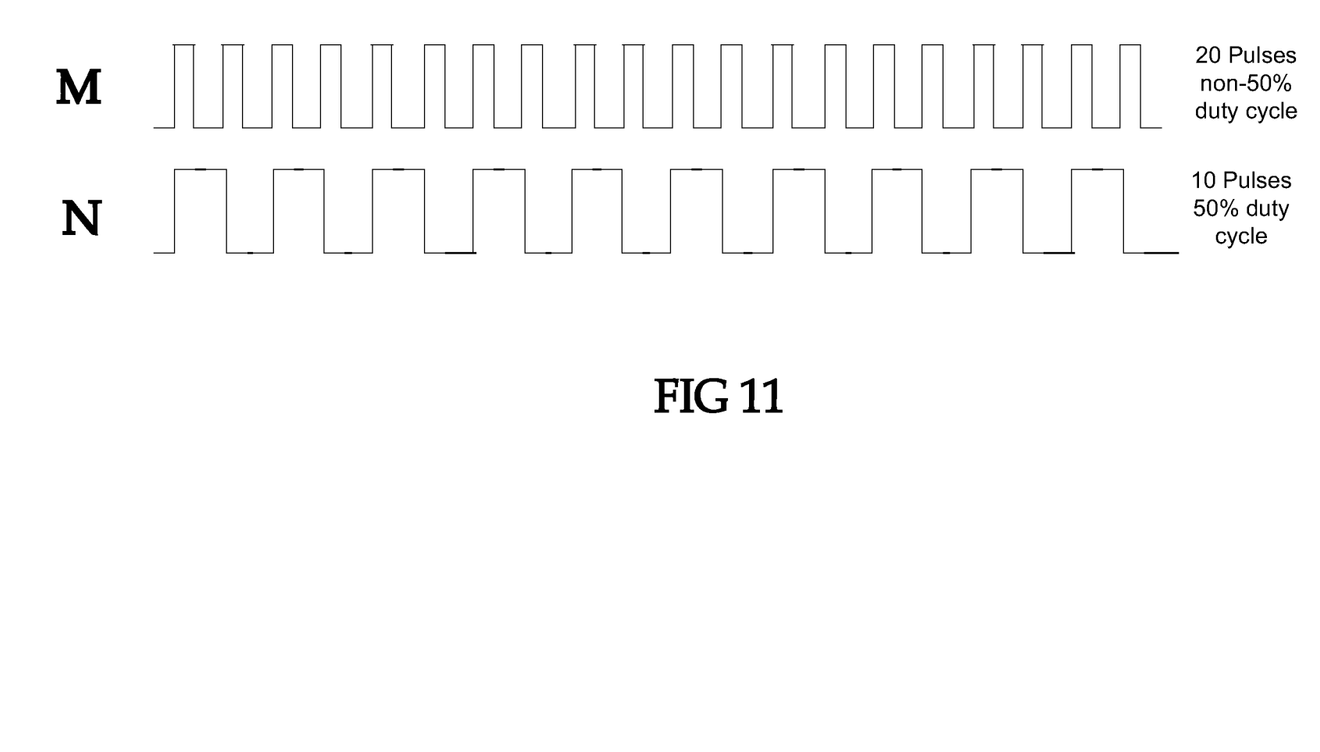
FIG. 11 shows interpolated output pulses or signals provided by the circuits of FIGS. 9 and 10.

Note that FIG. 11 shows interpolated output signals or pulses provided at outputs M and N of circuits 144 and 152 in FIG. 9

As further shown in FIG. 9, a DC voltage equivalent to the peak sinusoidal voltage ($V_{PEAK}$) and an offset or common mode voltage ($V_{REF}$) are supplied to voltage follower operational amplifiers 141 and 143, which are connected in unity gain mode, and from which all other reference voltages corresponding to the reference voltages set forth in Table 1 are generated using resistors $R_0$ through $R_9$. Another way to compute the DC reference voltages may be accomplished by dynamically measuring the peak-to-peak values of the incoming sinusoidal signals as described in the aforementioned U.S. Pat. No. 7,554,079.

Referring now to FIGS. 7 and 8, it will be seen that the 0° to 360° space is divided into four quadrants represented by numerals 1, 2, 3, and 4. FIG. 8 shows the basic principle of the decision logic employed in circuits 144 and 152 of FIG. 9. Between −45° and 45° the sin+ signal has highest rising slope and therefore is read and detected over the same interval as the cos− signal, which has the highest amplitude. At 0°, the cos− signal crosses sin(45°) (1*sin 45=0.707). Similarly, over the interval between 45° and 90°, the cos+ signal has the highest slope and the sin+ signal has the highest amplitude. Over any given interval or quadrant, only one signal from among the sin+, sin−, cos+, and cos− signals will have a value exceeding the sin(45°).

Figure 10:
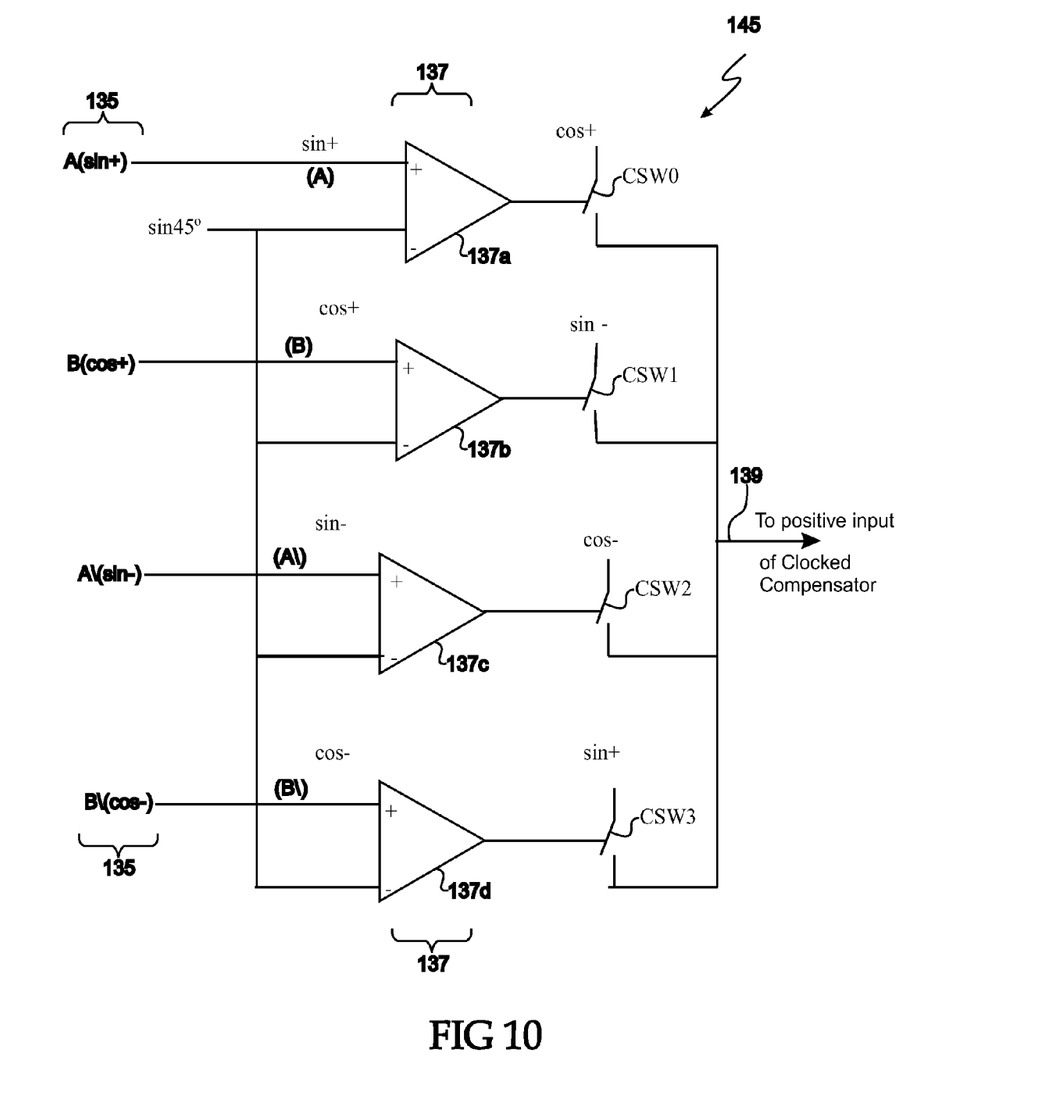
FIG. 10 shows one embodiment of slope detection circuitry 145.

Referring now to FIG. 10, there is shown slope detection circuit 145, which implements portions of the above-described decision logic. In FIG. 10, the sin+ signal is connected to the positive input of comparator 137a, the cos+ signal is connected to the positive input of comparator 137b, the sin− signal is connected to the positive input of comparator 137c, and the cos− signal is connected to the positive input of comparator 137d positive. The negative inputs of comparators 137a, 137b, 137c and 137d are all tied together and connected to a sin(45°) reference signal. When the sin+ signal is higher then the sin(45°) reference signal, the output of comparator 137a goes high and turns on switch SW0, which in turn connects the cos+ signal to the positive input of clocked comparator 156 of FIG. 9, where the cos− signal is presented for purposes of slope detection and subsequent interpolation. Similarly, when the cos+ signal exceeds the value of the sin(45°) reference signal, the sin− signal is connected to the positive input of clocked comparator 156. The process is then repeated for the sin− and cos− signals.

According to one embodiment, and with further reference to FIGS. 6 through 11, with particular emphasis on FIGS. 9 and 10, optical encoder signals are interpolated by emitting light from light emitter 20 towards a plurality of photodetectors or photodiodes that have leading and trailing edges arranged along a single track and a common axis to form a single track light detector light detector 140. Single track light detector 140 has disposed along the common axis pairs of A and A\ data channel light detectors and B and B\ data channel light detectors. First, second, third and fourth output ramp signals are then generated which correspond, respectively, to the A, A\, B and B\ light detectors, the A and B light detectors, and the A\ and B\ light detectors, where such light detectors are arranged to generate output signals that are 90 degrees out of phase with respect to one another. A peak voltage and an offset voltage corresponding to the output ramp signals are generated, and provided to reference voltage generation circuitry as inputs thereto (see FIG. 9). A plurality of different reference voltages are generated by resistor ladder 145 and corresponding controllable switches 147 in reference voltage generation circuitry 144 on the basis of the peak and offset voltages, where each reference voltage corresponds to a predetermined angular position of a sinusoidal signal over a predetermined range of angular positions. In other embodiments the resistor ladder is replaced with a digital-to-analog converter (DAC), which generates the necessary predetermined reference voltages. One such reference voltage is provided at any given time as a first input to clocked comparator 156. Slope detection circuit 145 has provided as inputs thereto the first, second, third and fourth output ramp signals, and generates slope detection circuit output signals corresponding to the predetermined range of angular positions for each of the first, second, third and fourth output ramp signals as such angular positions occur, and provides such slope detection circuit output signals as a second input to clocked comparator 156. On the basis of the first and second inputs to clocked comparator 156, clocked comparator 156 then provides interpolated output pulses, as shown in FIG. 11 (pulses M).

Note that the predetermined range of angular positions may be 90 degrees or assume a different suitable value. The peak voltage may be about plus or minus 1 volt, and the offset voltage provided to operational amplifiers 141 and 143 may be is about zero volts or any other suitable value. The peak voltage may also be about plus or minus 2 volts, and the offset voltage about one volt. Reference voltage generation circuitry 144 may further comprise first and second voltage follower amplifiers disposed at opposite ends of the resistor ladder (see operational amplifiers 141 and 143 in FIG. 9), where the first voltage follower receives a sum of the peak voltage and the offset voltage as an input thereto, and the second voltage follower receives the offset voltage as an input thereto. As shown in FIG. 9, resistor ladder 145 of reference voltage generation circuitry 144 may comprise a plurality of voltage dividers corresponding to equal increments of a predetermined range of angular positions, and the equal increments may be 9 degrees or any other suitable value. As shown in FIG. 9, the interpolated output pulses provided by clocked comparator 156 may be provided to a divide by two counter, or any other suitable counter. Likewise, the interpolated output pulses provided by clocked comparator 156 may be provided to an up-down counter 155 as inputs thereto, or to any other suitable counter, and the output from up-down counter 155 may be provided to 1-hot decoder 159 or any other suitable decoder as an input thereto. As shown in FIG. 9, the outputs from 1-hot decoder 159 may be employed to control opening and closing of the controllable switches of resistor ladder 145 in reference voltage generation circuitry 144. Moreover, up-down counter 155 may have power-on-reset circuit 157 connected as an input thereto.

Note that the interpolation techniques described herein may be adapted for use with trapezoidal signals, semi-sinusoidal signals, and other signals having morphologies other than per se sinusoidal waves or signals. Note further that interpolation factors other than 10×, 20× or 40× are contemplated, including, but not limited to, interpolation factors of 50×, 100× and 200×.

One example of an encoder that may be modified in accordance with at least some of the embodiments, teachings and disclosure presented herein is the AVAGO TECHNOLOGIES™ AEDT-9340 encoder. A Data Sheet for this encoder is included in an Information Disclosure Statement filed on even date herewith, and is entitled "AEDT-9340 Series; High Temperature 115° C.; 1250/2500 CPR 6-Channel Commutation Encoder," the entirety of which is hereby incorporated herein.

It will now be understood that the various embodiments presented and described herein are simple and easy to implement, and may be integrated using any suitable process technology, such as CMOS or BiCMOS. The various embodiments of current amplifier encoders are well suited for use in high speed applications. Moreover, the various embodiments of current amplifier encoders disclosed herein may be implemented in small die sizes.

Given the preponderance of precision motion and speed detection applications, industry demands high resolution encoders having interpolation factors of 10×~1000×. Such high resolution requirements place considerable demands on conventional approaches that employ zero-crossing techniques in optical encoders, and can lead to significant errors for interpolation factors greater than 50×. The use of analog-to-digital converters (ADCs) on incoming analog sinusoidal signals for interpolation purposes not only requires the use of a relatively complex analog front end, but also requires the use of hardware that is relatively large in size or footprint. The interpolation techniques and circuitry disclosed above reduce hardware requirements significantly, and therefore saves precious silicon real estate in integrated circuits. Because the slopes of incoming sinusoidal signals are detected with great accuracy, the interpolation methods and circuits described herein minimize phase errors in the interpolated output pulses or signals provided thereby.

The various embodiments of the invention solve certain problems and have certain advantages. In some embodiments, die sizes may be made smaller, encoder speeds may be increased, manufacturing costs may be reduced, IC design time may be decreased and simplified, and the size and cost of a single track optical encoder can be maintained or even reduced while increasing the spatial resolution of the encoder. Typically, an integrated circuit in a reflective optical encoder is the single most expensive component in a reflective optical encoder system. The small footprints and sizes permitted by the single track configuration disclosed herein permit small encoders with high resolution to be constructed. Various embodiments of the optical reflective encoder also permit higher resolutions to be achieved than possible heretofore, notwithstanding the smaller size and footprint of the encoder.

The various embodiments are relatively simple and easy to implement, and result in smaller packages, reduce die and assembly cost, and use conventional and simple electronic circuitry.

Included within the scope of the present invention are methods of making and having made the various components, devices and systems described herein.

Various embodiments of the invention are contemplated in addition to those disclosed hereinabove. For example, transmissive optical encoders incorporating the single track and other features of the embodiments described hereinabove are specifically contemplated.

Those skilled in the art will now understand that many different combinations, permutations and variations of the novel current amplifier encoders described above, but not necessarily disclosed explicitly herein, can be formulated without departing from the spirit and scope of the invention.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

I claim:

1. A method of interpolating optical encoder signals, comprising:

emitting light from a light emitter towards a plurality of photodetectors or photodiodes having leading and trailing edges arranged along a single track and a common axis to form a single track light detector light detector, the single track light detector having disposed along the common axis pairs of A and A\ data channel light detectors and B and B\ data channel light detectors, generating first, second, third and fourth output ramp signals corresponding, respectively, to the A, A\, B and B\ light detectors, the A and B light detectors, and the A\ and B\ light detectors, respectively, being arranged to generate output signals that are 90 degrees out of phase with respect to one another;

generating a peak voltage and an offset voltage corresponding to the output ramp signals, and providing the peak voltage and the offset voltage to reference voltage generation circuitry as inputs thereto;

generating, with a resistor ladder and corresponding controllable switches or a digital-to-analog converter (DAC) in the reference voltage generation circuitry, and on the basis of the peak and offset voltages, a plurality of different reference voltages including a first, second, third, and fourth reference voltage, the first, second, third, and fourth reference voltage corresponding to a predetermined angular position of the first, second, third, and fourth output ramp signals, respectively, over a predetermined range of angular positions, only one of the plurality of different reference voltages being provided at any given time as a first input to a clocked comparator;

generating, with a slope detection circuit having provided as inputs thereto the first, second, third and fourth output ramp signals, slope detection circuit output signals corresponding to the predetermined range of angular positions for each of the first, second, third and fourth output ramp signals as such angular positions occur and providing such slope detection circuit output signals as a second input to the clocked comparator, and outputting from the clocked comparator, on the basis of the first and second inputs to the clocked comparator, interpolated output pulses.

2. The method of claim 1, wherein the predetermined range of angular positions is 90 degrees.

3. The method of claim 1, wherein the peak voltage is about plus or minus 1 volt and the offset voltage is about zero volts.

4. The method of claim 1, wherein the peak voltage is about plus or minus 2 volts and the offset voltage is about one volt.

5. The method of claim 1, wherein the reference voltage generation circuitry further comprises first and second voltage follower amplifiers disposed at opposite ends of the resistor ladder, the first voltage follower receiving a sum of the peak voltage and the offset voltage as an input thereto, the second voltage follower receiving the offset voltage as an input thereto.

6. The method of claim 1, wherein the resistor ladder of the reference voltage generation circuitry further comprises a plurality of voltage dividers corresponding to equal increments of the predetermined range of angular positions.

7. The method of claim 6, wherein the equal increments are 9 degrees.

8. The method of claim 1, wherein the interpolated output pulses are provided to a divide by two counter.

9. The method of claim 1, wherein the interpolated output pulses are provided to an up-down counter as inputs thereto.

10. The method of claim 9, wherein an output from the up-down counter is provided to a 1-hot decoder as an input thereto.

11. The method of claim 10, wherein the up-down counter is a 4-bit binary up-down counter that detects positive slopes of the first, second, third, and fourth output ramp signals to select the first input to the clocked comparator based on which among the first, second, third, and fourth output ramp signals has the highest rising slope and wherein outputs from the 1-hot decoder are employed to control opening and closing of the controllable switches of the resistor ladder in the reference voltage generation circuitry.

12. The method of claim 9, wherein the up-down counter has a power-on-reset circuit connected as an input thereto.

13. An optical encoder, comprising:

a light emitter configured to emit light therefrom;

a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals;

signal generation circuitry comprising at least first, second, third and fourth amplifiers configured to receive as inputs thereto, respectively, the first, second, third and fourth output ramp signals corresponding to the A, A\, B and B\ light detectors, the first amplifier being configured to provide an A output ramp signal, the second amplifier being configured to an A\ output ramp signal, the third amplifier being configured to provide a B output ramp signal, the fourth amplifier being configured to a B\ output ramp signal;

peak voltage generation circuitry configured to generate a peak voltage corresponding to the output ramp signals;

reference voltage generation circuitry comprising a resistor ladder or a digital-to-analog converter (DAC) and corresponding controllable switches configured to generate on the basis of the peak and offset voltages provided as inputs thereto a plurality of different reference voltages including a first, second, third, and fourth reference voltage, the first, second, third, and fourth reference voltage corresponding to a predetermined angular position of the first, second, third, and fourth output ramp signals, respectively, over a predetermined range of angular positions, only one of the plurality of different reference voltages being provided at any given time as a first input to a clocked comparator, and slope detection circuitry having provided as inputs thereto the first, second, third and fourth output ramp signals, and configured to generate slope detection circuitry output signals corresponding to the predetermined range of angular positions for each of the first, second, third and fourth output ramp signals as such angular positions occur, such slope detection circuitry output signals being provided as a second input to the clocked comparator;

wherein the clocked comparator is configured to output on the basis of the first and second inputs thereto interpolated output pulses.

14. The optical encoder of claim 13, wherein the peak voltage generation circuitry is further configured to generate an offset voltage corresponding to the output ramp signals.

15. The optical encoder of claim 13, wherein the predetermined range of angular positions is 90 degrees.

16. The optical encoder of claim 13, wherein the peak voltage is about plus or minus 1 volt and the offset voltage is about zero volts.

17. The optical encoder of claim 13, wherein the peak voltage is about plus or minus 2 volts and the offset voltage is about one volt.

18. The optical encoder of claim 13, wherein the reference voltage generation circuitry further comprises first and second voltage follower amplifiers disposed at opposite ends of the resistor ladder, the first voltage follower receiving a sum of the peak voltage and the offset voltage as an input thereto, the second voltage follower receiving the offset voltage as an input thereto.

19. The optical encoder of claim 13, wherein the resistor ladder of the reference voltage generation circuitry further comprises a plurality of voltage dividers corresponding to equal increments of the predetermined range of angular positions.

20. The optical encoder of claim 13, wherein the equal increments are 9 degrees.

21. The optical encoder of claim 13, wherein the interpolated output pulses are provided to a divide-by-two counter.

22. The optical encoder of claim 13, wherein the interpolated output pulses are provided to an up-down counter as inputs thereto.

23. The optical encoder of claim 22, wherein an output from the up-down counter is provided to a 1-hot decoder as an input thereto.

24. The optical encoder of claim 23, wherein the up-down counter is a 4-bit binary up-down counter that detects positive slopes of the first, second, third, and fourth output ramp signals to select the first input to the clocked comparator based on which among the first, second, third, and fourth output ramp signals has the highest rising slope and wherein outputs from the 1-hot decoder are employed to control opening and closing of the controllable switches of the reference voltage generation circuitry.

25. The optical encoder of claim 22, wherein the up-down counter has a power-on-reset circuit connected as an input thereto.

* * * * *